UNITED STATES PATENT OFFICE.

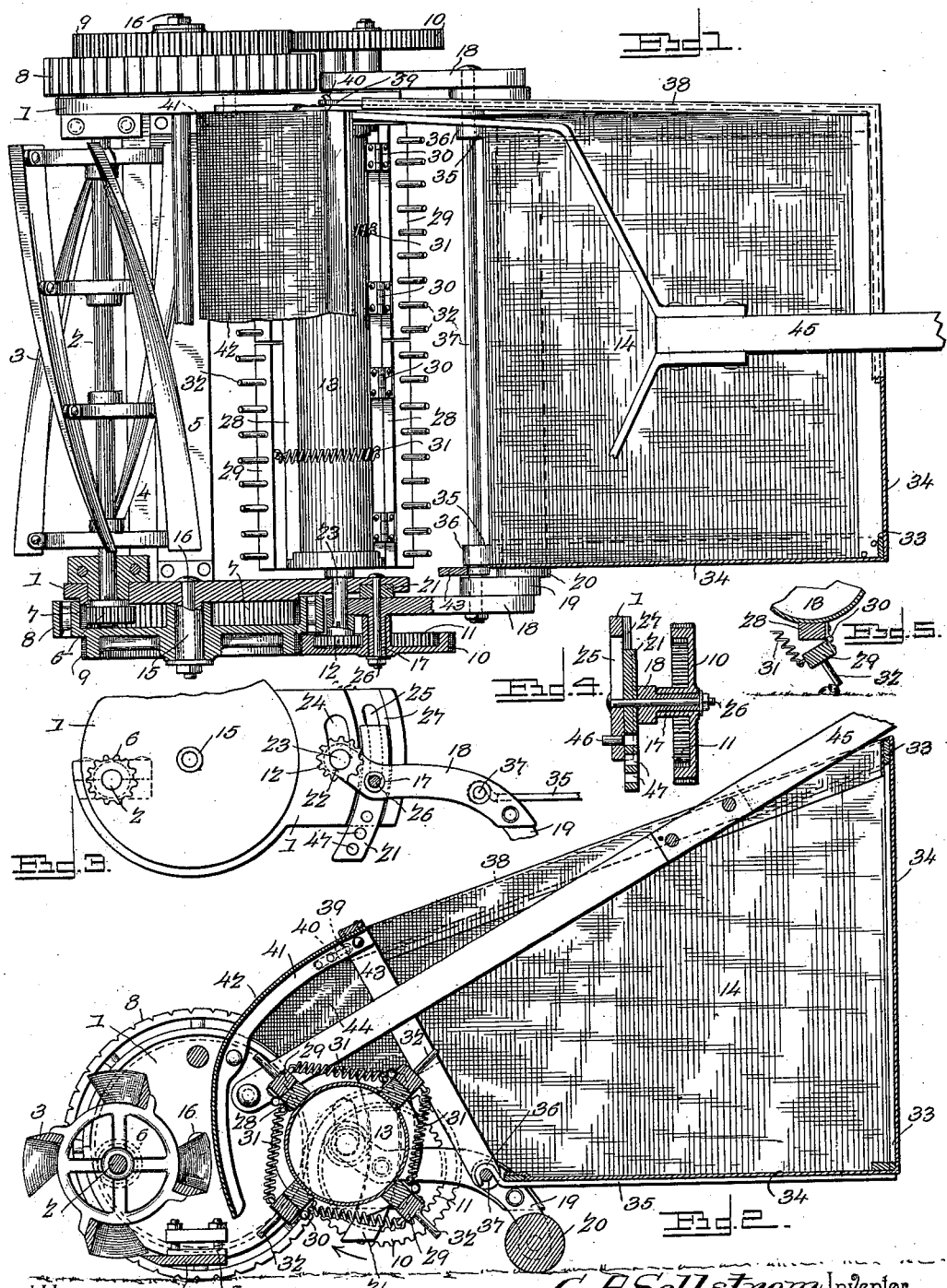

CARL ALLBIN SELLSTROM, OF PRINCETON, ILLINOIS.

LAWN-MOWER.

SPECIFICATION forming part of Letters Patent No. 661,081, dated November 6, 1900.

Application filed June 27, 1900. Serial No. 21,806. (No model.)

*To all whom it may concern:*

Be it known that I, CARL ALLBIN SELLSTROM, a citizen of the United States, residing at Princeton, in the county of Bureau and State of Illinois, have invented a new and useful Lawn-Mower, of which the following is a specification.

The invention relates to improvements in lawn-mowers.

One object of the present invention is to improve the construction of lawn-mowers, more especially to provide an attachment for the same for enabling the severed grass to be swept into a receptacle, and also to provide such a device which will be adapted to adjust itself automatically to the configuration of the surface of the ground, so that the same will be thoroughly cleaned.

Another object of the invention is to provide a rotary rake having yieldingly-mounted teeth adapted to pass over small stones or similar obstructions without being injured.

The invention consists in the construction and novel combination and arrangement of parts hereinafter fully described, illustrated in the accompanying drawings, and pointed out in the claims hereto appended.

In the drawings, Figure 1 is a plan view, partly in section, of a lawn-mower constructed in accordance with this invention. Fig. 2 is a longitudinal sectional view of the same. Fig. 3 is a detail view of one side of the frame of the lawn-mower, illustrating the manner of adjustably mounting the bearings of the rotary rake. Fig. 4 is a sectional view illustrating the manner of mounting the curved slide. Fig. 5 is a detail sectional view illustrating the manner of mounting the hinged rakes.

Like numerals of reference designate corresponding parts in all the figures of the drawings.

1 1 designate the sides of a lawn-mower frame which is provided at its front with suitable bearings for the shaft 2 of a rotary cutter 3, and the latter, which may be constructed in any suitable manner, operates in connection with a ledger-blade 4, secured to a transverse supporting-bar 5. The ledger-blade-supporting bar is adjustably mounted in the usual manner, as clearly indicated in Fig. 2 of the accompanying drawings, to enable it to be properly set with relation to the blades of the rotary cutter. The ends of the shaft 2 extend beyond the sides 1 of the main frame and have pinions 6 keyed or otherwise secured to them, and these pinions mesh with internal teeth 7 of wheels 8. The wheels 8, which support the front of the lawn-mower, have corrugated peripheries and are provided at their outer faces with integral external gears 9; but the latter may be fixed to the wheels 8 in any other suitable manner. The external gears 9 of the wheels 8 mesh with rear cogs 10, having internal teeth 11, which mesh with rear pinions 12 of a rotary rake 13, located in rear of the rotary cutter and adapted to rotate in the opposite direction to the same to sweep the severed grass upward in front of it and carry the same into a rear receptacle 14. The wheels are mounted upon stub-shafts 15, which are hollow to receive bolts 16 for retaining the said wheels on the stub shafts or axles 15, and the rear gear-wheels 10 are mounted on stub-shafts 17 of adjustable bars or sections 18, which extend rearward from the sides 1 of the frame. The bars or sections 18, which are curved rearward and downward, are provided with adjustable bearings 19, receiving the journals of a transverse roller 20 for supporting the rear of the lawn-mower. The adjustable bearings, which are adapted to enable the rotary rake to be properly set with relation to the ground, are provided with perforations for the reception of bolts for securing them to the curved bars or sections 18.

The curved bars or sections 18 are secured between their ends to curved guides 21 and are provided at their front ends with bearing-openings 22, through which extend the journals of the rotary rake, and these journals 23 have the rear pinions 12 keyed or otherwise fixed to them. The sides 1 of the frame of the mower are provided with curved slots 24 and 25 for the journals 23 and for bolts 26, which pass through the stub-shafts 17 and through the curved guides. The curved slots 24 and 25 permit the rotary rake and the rear roll or roller 20 to adjust themselves automatically to the surface of the ground. The curved slides, which are interposed between the bars or sections 18, are arranged in curved grooves 27 of the outer faces of the sides of the frame of the lawn-mover.

The rotary mower 13 consists of a cylindrical body portion provided on its exterior with bars 28 and having rakes 29, arranged in pairs and hinged to the bars 28, which extend longitudinally of the cylinder or body portion. The rakes, which extend longitudinally of the cylinder and transversely of the machine, are preferably arranged in pairs or in two sections and are hinged at their rear edges at 30 and are connected at their front edges with coiled springs 31. The rotary mower travels in the direction of the arrow in Fig. 2 of the accompanying drawings, and should either rake or section contact with a small stone or other obstruction, as illustrated in Fig. 5 of the accompanying drawings, it will swing backward and pass over the same without breaking any of the teeth 32, the springs and the hinges permitting such operation. The coiled springs, which are secured at their rear ends to the front edges of the heads or bars of the rakes, are connected at their front ends to the adjacent bar of the cylinder. When the machine is moved forward, the cutter is rotated in the usual manner, and the rotary mower is also actuated and is adapted to rake up the severed grass, and it will collect leaves or the like, so that the lawn will be perfectly clean after the mower passes over it.

The receptacle 14, which may be constructed of any suitable material, preferably consists of a metal frame 33 and a fabric covering 34, and it is supported above the ground in a plane above the stationary cutter-blade, as shown in Fig. 2. The side bars 35 of the bottom of the receptacle are provided at their front ends with hooks 36, which detachably engage a transverse rod 37, extending across the frame of the mower and connecting the curved bars or sections 18, as clearly shown in Fig. 1. The side bars 38 of the upper portion or top of the frame of the receptacle are located at the upper edges of the sides of the same and are provided at their front ends with eyes 39 for engaging hooks 40, located at opposite sides of the lawn-mower and mounted on curved bars 41, which support an apron or shield 42. The curved bars 41, which are secured to the inner faces of the sides of the frame, are supported by inclined bracing bars or strips 43, extending downward and rearward from the upper ends of the bars 41 to the transverse rod 37. The curved shield or apron extends downward in advance of the upper portion of the rotary rake, and it projects over the same a sufficient distance to cause all of the grass carried upward by the said rotary rake to be thrown into the receptacle. The curved bars and the inclined bracing bars or strips 43 form supports for extensions 44 of the sides of the receptacle, and these extensions or pieces are permanently mounted on the lawn-mower with the apron, the receptacle being detachably secured to the mower by means of the said hooks 40 and being adapted to be readily removed for emptying the grass or other accumulation. The lawn-mower is provided with a suitable handle 45 and is adapted to be operated in the usual manner.

It will be seen that the improvements are exceedingly simple and inexpensive in construction, that the rotary rake is capable of carrying the severed grass and leaves into the receptacle, and that the latter is supported above and out of contact with the ground, thereby enabling the lawn-mower to run much more easily than would be the case were the receptacle permitted to drag. It will also be seen that the rotary rake and the rear support or roller of the mower are capable of automatic adjustment to adapt themselves to the character of the surface to be operated on and that the teeth of the rotary rake are yieldingly mounted and adapted to pass readily over an obstruction without breaking the teeth.

In order to enable the slides to be rigidly connected with the sides of the frame, the latter is provided with pins 46 or other suitable adjusting devices adapted to engage perforations 47, arranged at intervals in the lower portions of the slides.

What I claim is—

1. In a lawn-mower, the combination of a frame, a rotary cutter arranged at the front of the frame, a receptacle located in rear of the cutter and separated from the same by an open space, and a rotary rake operating in the open space in front of the receptacle and arranged to engage the surface of the ground, whereby it is adapted to carry the severed grass therefrom into the receptacle, substantially as described.

2. In a machine of the class described, the combination of a frame, a rotary cutter arranged at the front of the frame, a stationary blade, a receptacle located in rear of and spaced from the stationary blade, and a rotary rake arranged in the open space between the receptacle and the stationary blade and having teeth arranged to operate on the ground, whereby the severed grass is carried therefrom into the receptacle, substantially as described.

3. In a machine of the class described, the combination of a frame, a rotary cutter, a stationary blade, a receptacle located in rear of and spaced from the stationary blade and having its bottom located in a plane above the same, and a rotary rake arranged in the open space in front of the receptacle and having teeth arranged to operate on the ground and adapted when moving forward at the surface of the ground to carry the severed grass upward in front of the rotary rake, substantially as described.

4. In a machine of the class described, the combination of a frame, a rotary cutter, a stationary cutting-blade, a receptacle located in rear of and separated from the stationary blade by an open space and having its bottom arranged in a plane above the said stationary blade, a rotary rake operating in the open space in advance of the bottom of the receptacle and having teeth arranged to engage the surface of the ground, means for rotating the rake to carry its teeth forward at the surface of the ground, and an apron or shield arranged in advance of the rotary rake and extending rearward over the same to direct the severed grass into the receptacle, substantially as described.

5. In a machine of the class described, the combination of a frame, a rotary cutter, a receptacle, and a rotary rake comprising the body portion and hinged spring-supported rakes mounted on the body portion and arranged at intervals around the same, substantially as described.

6. In a machine of the class described, the combination of a frame, a rotary cutter, a receptacle, and a rotary rake comprising a cylindrical body portion provided with bars extending longitudinally of it, rakes hinged to the bars, and springs located in advance of the rakes and connected with the same and with the bars next in advance, substantially as described.

7. In a machine of the class described, the combination of a frame, a rotary cutter, a receptacle detachably secured to the frame and located above the ground, a rotary rake interposed between the receptacle and the rotary cutter, a curved apron extending downward in advance of the rotary rake and projecting rearward over the same, and the side extensions arranged at the ends of the apron, substantially as described.

8. In a machine of the class described, the combination of a frame, a rotary cutter, a front pinion connected with the rotary cutter, a wheel provided with internal and external gears, the internal gear meshing with the said pinion, a rotary rake arranged in rear of the cutter, a rear pinion connected with the rotary rake, and a rear gear provided with internal and external teeth and meshing with the rear pinion and with the said wheel, substantially as described.

9. In a machine of the class described, the combination of a frame, a rotary cutter, a rotary rake located in rear of the rotary cutter and capable of adjustment independently of the frame, a rear support connected with the rotary rake and supporting the rear of the machine, and gearing connecting the rake with the cutter, substantially as described.

10. In a machine of the class described, the combination of a frame, a rotary cutter, slides mounted on the frame and adapted to move upward and downward thereon, a transverse roller connecting the slides, a rotary rake also connected with the slides and capable of upward and downward movement with the said roller, and gearing connecting the cutter and the rake, substantially as described.

11. In a machine of the class described, the combination of a frame, a rotary cutter mounted on the frame, the curved slides mounted on the frame in suitable ways thereof, the bars connected with the slides, a transverse roller connecting the bars, a rotary rake journaled in the latter, and gearing connecting the rake and the cutter, substantially as described.

12. In a machine of the class described, the combination of a frame, a rotary cutter, a curved slide mounted on the frame in a suitable guide or way, a rotary rake having a journal extending through a slot of the frame, a bar secured to the slide and provided at its front end with a bearing receiving the journal of the rotary rake, and gearing connecting the rotary rake with the cutter, substantially as described.

13. In a machine of the class described, the combination of a frame provided with ways, slides mounted in the ways and capable of adjustment on the frame, bars connected between their ends to the slides, a rotary rake mounted on the front ends of the bars, and adjusting devices mounted on the frame and engaging the slides, substantially as described.

In testimony that I claim the foregoing as my own I have hereto affixed my signature in the presence of two witnesses.

CARL ALLBIN SELLSTROM.

Witnesses:
 FRED LEHMAN,
 H. FULLER.